United States Patent [19]

Fogelberg

[11] Patent Number: 4,584,894
[45] Date of Patent: Apr. 29, 1986

[54] TRANSMISSION ANTI-CLASH AND ANTI-RATTLE BRAKE

[75] Inventor: Mark J. Fogelberg, Muncie, Ind.

[73] Assignee: Borg-Warner Corporation, Chicago, Ill.

[21] Appl. No.: 584,567

[22] Filed: Feb. 29, 1984

[51] Int. Cl.⁴ .................. B60K 20/04; B60K 41/26
[52] U.S. Cl. ................... 74/473 R; 192/4 C
[58] Field of Search ............ 74/473 R, 476; 192/4 C, 192/4 A

[56] References Cited

U.S. PATENT DOCUMENTS

| | | | |
|---|---|---|---|
| 1,683,528 | 9/1928 | Carlton | 192/4 C X |
| 2,606,461 | 8/1952 | Herndon | 192/4 C X |
| 3,132,729 | 5/1964 | Garland | 192/4 C |
| 4,128,151 | 12/1978 | Grosseau | 192/4 C X |
| 4,181,036 | 1/1980 | Janke | 74/473 R X |
| 4,192,410 | 3/1980 | Poirier | 192/4 C X |
| 4,221,283 | 9/1980 | Nordkvist et al. | 192/4 C |
| 4,294,338 | 10/1981 | Simmons | 192/53 F X |
| 4,337,675 | 7/1982 | Holdeman | 74/471 R X |
| 4,373,618 | 2/1983 | Sabel | 192/4 C X |
| 4,430,904 | 2/1984 | Fogelberg | 192/4 A X |
| 4,467,665 | 8/1984 | Katayama et al. | 192/4 C X |
| 4,503,957 | 3/1985 | Ikemoto et al. | 192/4 C |
| 4,510,819 | 4/1985 | Inui | 192/4 C X |

FOREIGN PATENT DOCUMENTS 2056598  3/1981  United Kingdom .............. 192/4 A

*Primary Examiner*—George H. Krizmanich
*Assistant Examiner*—D. Wright
*Attorney, Agent, or Firm*—Julian Schachner

[57] ABSTRACT

An anti-clash and anti-rattle brake for a multiple speed ratio transmission is engageable to apply a frictional braking force to the constantly meshed gears when a shift control device is in a free neutral position. The brake is spring biased toward engagement. It is disengaged by one cam device when the shift control device is moved from the free neutral position in one plane and by another cam device when the shift control device is moved from the free neutral position in another plane.

25 Claims, 8 Drawing Figures

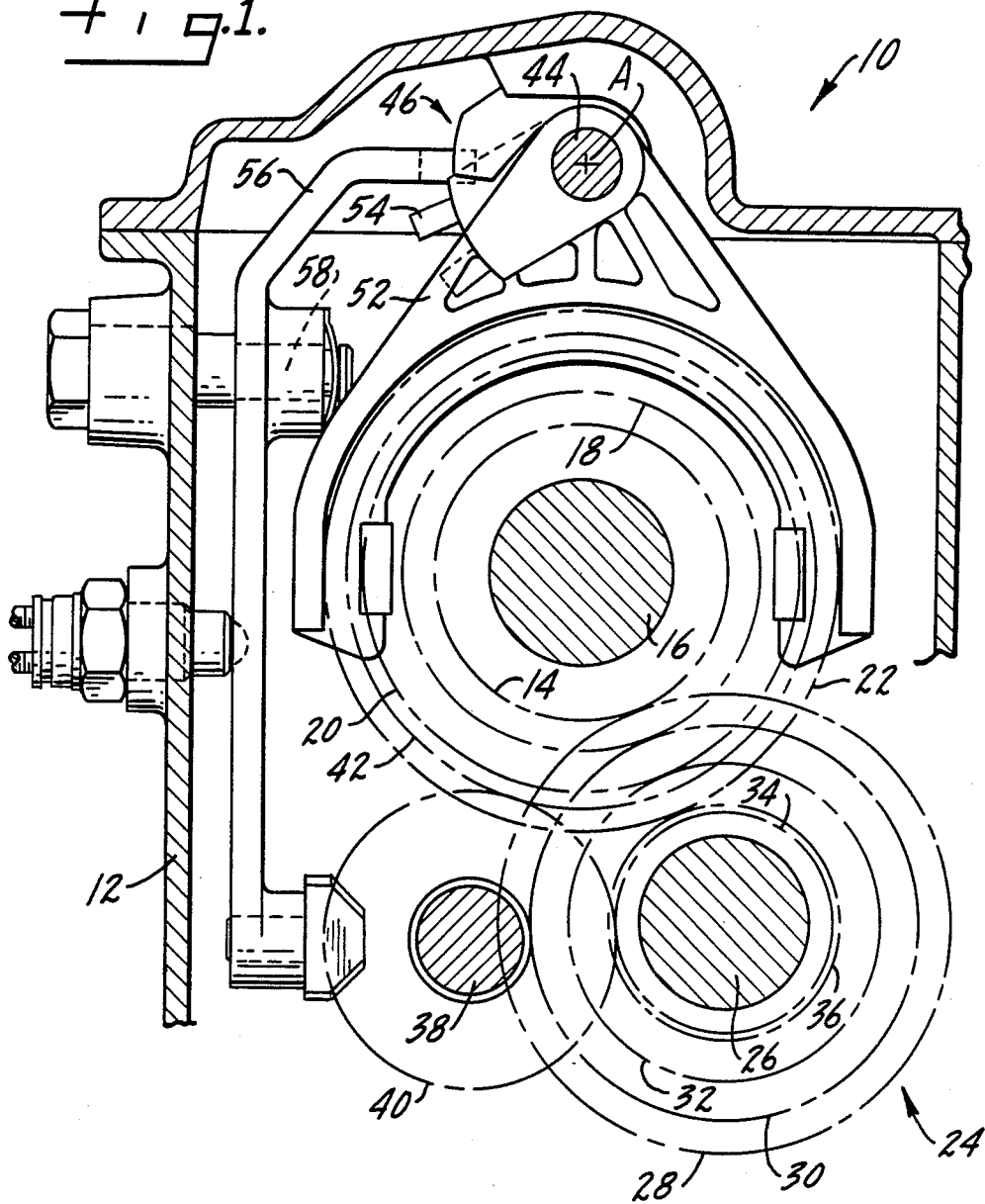
Fig.1.
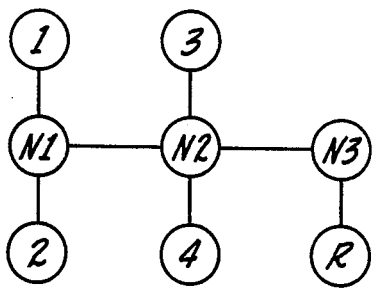
Fig.2.
Fig.3.

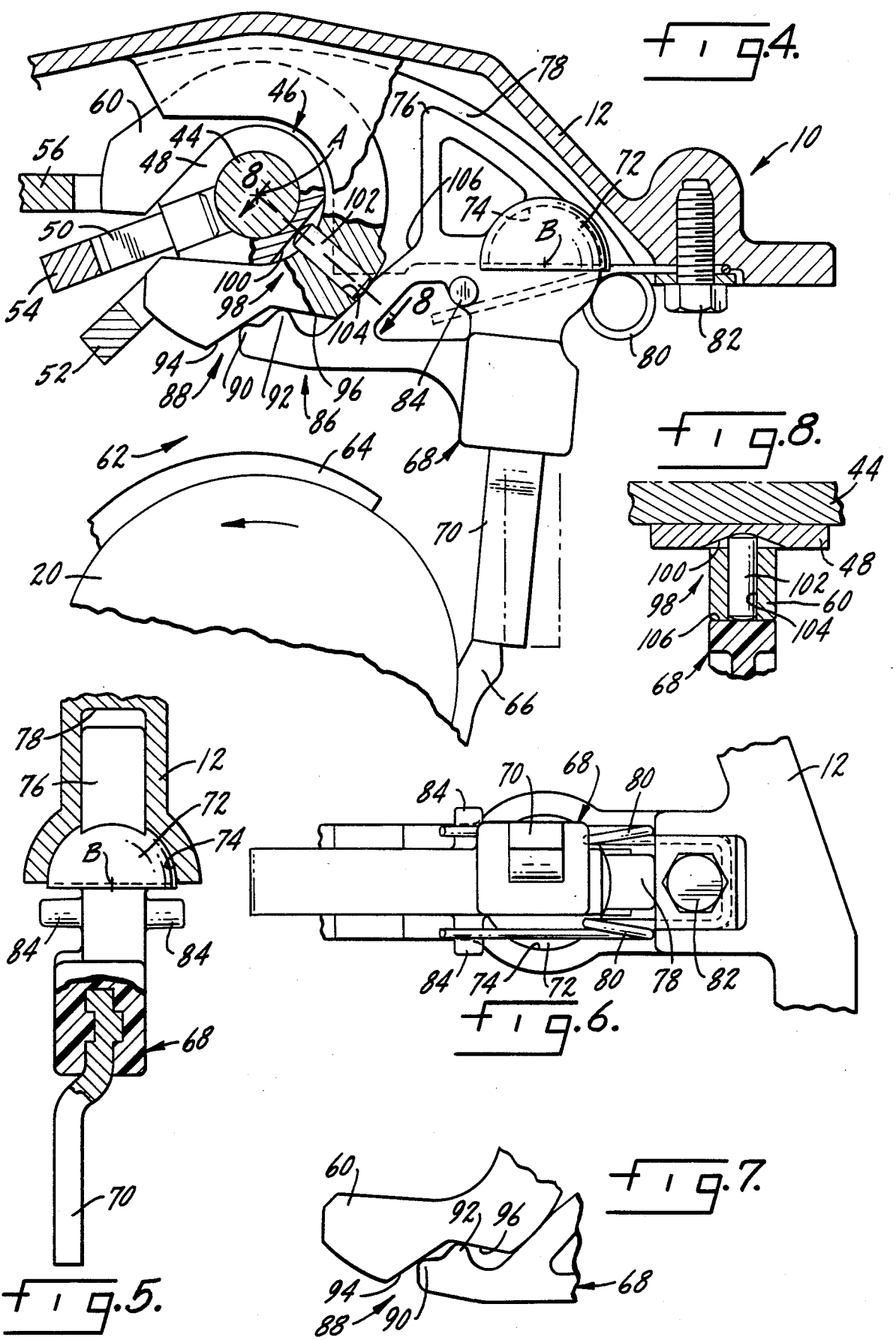

4,584,894

TRANSMISSION ANTI-CLASH AND ANTI-RATTLE BRAKE

BACKGROUND OF THE INVENTION

This invention relates generally to an automotive transmission or the like. More particularly, it relates to an anti-clash and anti-rattle brake for use in a multiple speed ratio manual transmission.

In recent years there have been many improvements in automotive drive trains, including improvements related to apparatus for shifting a manual transmission of the type incorporating a plurality of synchronized forward speed ratios and a non-synchronized reverse speed ratio. Such shift apparatus typically provides a plurality of crossover positions for a shift stick. Each crossover position selects a shift fork or lever which then may be moved to engage appropriate gears for establishing a particular speed ratio.

U.S. Pat. No. 4,337,675 issued July 6, 1982 discloses this type of shift apparatus. The patent is of common assignee herewith, and is incorporated herein by reference. The shift apparatus includes a shift stick which is movable in one plane to a plurality of neutral crossover positions, thereby rotating a shift rail about its longitudinal axis for speed ratio selection. The shift stick then is movable in another plane from each neutral crossover position, thereby sliding the shift rail along its longitudinal axis to engage appropriate gears for establishing the selected speed ratio. From a first neutral position gears may be engaged to establish the first or second forward speed ratio. From a second neutral position gears may be engaged to establish the third or fourth forward speed ratio. From a third neutral position gears may be engaged to establish the reverse speed ratio in a four-speed transmission, or the fifth forward or reverse speed ratio in a five-speed transmission.

To establish reverse, a non-synchronized reverse idler gear is slidable into meshing engagement with other gears in a reverse gear train. Typically at least one of these is synchronized, that is, rotating as part of a plurality of constantly meshed gears. In order to avoid gear clash, it would be desirable to brake the rotating gear before it is engaged by the reverse idler gear.

It would also be desirable to retard gear rattle by braking the constantly meshed gears when the transmission is in neutral, the clutch is engaged, and the engine of an associated vehicle is idling.

U.S. Pat. No. 4,294,338 issued Oct. 13, 1981 discloses shift apparatus including a modified synchronizer which functions as a countershaft brake. The patent is of common assignee herewith, and is incorporated herein by reference. Although this brake represents an advance in the art, it takes effect after crossover selection, that is, during gear-engaging movement of the reverse idler gear. It is known now that in some instances this is not soon enough to avoid gear clash. In any event, this apparatus does not provide an anti-rattle function.

U.S. Pat. No. 4,430,904 issued Feb. 14, 1984 discloses an anti-clash brake which takes effect during crossover selection, that is, prior to gear-engaging movement of the reverse idler gear. The patent is of common assignee herewith, and is incorporated herein by reference. This brake also represents an advance in the art. However, even though it takes effect during crossover selection, there are times when this too is not soon enough to avoid gear clash. It is clear now that in some instances the vehicle operator must pause briefly during the neutral-to-reverse shift to allow sufficient time for the brake to take effect. In addition, the braking effort continues when the transmission is engaged either in reverse or in any forward gear ratio which is engageable from the same crossover position as reverse. This contributes to excessive wear of the braking elements, and reduces transmission efficiency. Also, in the event of gear blockage during reverse engagement, additional friction makes completion of the operation difficult. Finally, this brake does not provide an anti-rattle function.

Thus there remains a need in the art for a simple, inexpensive brake which is effective before crossover selection to eliminate gear clash when a non-synchronized gear is to be engaged with a synchronized gear in a multiple speed ratio transmission. Further, it would be desirable for the brake to provide an anti-rattle function when the transmission is in neutral, the clutch is engaged, and the engine of an associated vehicle is idling.

SUMMARY OF THE INVENTION

This invention is directed to apparatus which meets this need. To that end, there is disclosed a multiple speed ratio transmission having a plurality of constantly meshed gears defining a plurality of speed ratios, and another gear movable into meshing relationship with the constantly meshed gears for defining another speed ratio. The gears are selectively engageable for establishing speed ratios providing torque delivery paths between an input and an output. Control means is movable to a free neutral position and at least one other neutral position for speed ratio selection, and is movable from at least one of the neutral positions for establishing a selected speed ratio. An anti-clash and anti-rattle brake is effective to brake the constantly meshed gears. The brake is engaged upon movement of the control means to the free neutral position, and is disengaged upon movement of the control means from the free neutral position.

BRIEF DESCRIPTION OF THE DRAWINGS

The objects and advantages of this invention will become apparent to those skilled in the art upon careful consideration of the specification herein, including the drawings, wherein:

FIG. 1 is a cut-away view of a typical four-speed and reverse transmission, partially in section, showing the overall relationship of the components with some structure simplified or omitted for clarity;

FIG. 2 is a diagramatic illustration showing the shift pattern for the transmission of FIG. 1;

FIG. 3 is a diagramatic illustration showing the shift pattern for a typical five-speed and reverse transmission;

FIG. 4 is an enlarged cut-away view, partially in section, showing details of the anti-clash and anti-rattle brake of this invention incorporated in the transmission of FIG. 1;

FIG. 5 is an end view of the structure shown in FIG. 4, partially in section, with some structure omitted for clarity;

FIG. 6 is a bottom view of the structure shown in FIG. 4, with some structure omitted for clarity;

FIG. 7 is a view showing details of a portion of the structure of FIG. 4; and

FIG. 8 is a sectional view, taken along the line 8—8 of FIG. 4, showing details of another portion of the structure.

While this invention is susceptible of embodiment in many different forms, the preferred embodiment is shown in the drawings and described in detail. It should be understood that the present disclosure is considered to be an exemplification of the principles of the invention, and is not intended to limit the invention to this embodiment.

DESCRIPTION OF THE PREFERRED EMBODIMENT

Referring to FIG. 1 of the drawings in greater detail, there is shown generally a multiple speed ratio transmission 10 adapted for use in an automotive vehicle. Transmission 10 includes a transmission housing 12. An input gear 14 is defined by an input shaft (not shown) which is journalled in housing 12 and is adapted to receive torque from the engine of an associated vehicle through an appropriate clutch. An output shaft 16 (coaxial with the input shaft) is journalled in housing 12 and is adapted to direct torque to the drive axle of the vehicle. Output gears 18, 20, and 22 are journalled on output shaft 16.

A cluster gear assembly 24 includes a countershaft 26 journalled in housing 12. Defined by countershaft 26 is a drive gear 28 in mesh with input gear 14. Similarly, there are defined a countershaft gear 30 in mesh with output gear 18, a countershaft gear 32 in mesh with output gear 20, a countershaft gear 34, and a countershaft gear 36 in mesh with output gear 22.

A reverse idler shaft 38 is supported in housing 12. A reverse idler gear 40 is journalled on shaft 38 and is slidable relative thereto.

As disclosed in detail in the aforementioned U.S. Pat. No. 4,337,675, a reverse output gear 42 is defined by one of two conventional synchronizers (not shown) supported on output shaft 16. When gears 34 and 42 are in alignment, reverse idler gear 40 is slidable into meshing engagement with them to define a reverse gear train 34,40,42.

Referring now to FIGS. 1 and 4, a shift rail 44 is supported in housing 12 for rotation about and sliding movement along its longitudinal axis A. A suitable shift control device 46 is associated with shift rail 44. If desired, shift control device 46 may be of the type disclosed in detail in U.S. Pat. No. 3,929,029 issued Dec. 30, 1975. The patent is of common assignee herewith, and is incorporated herein by reference. Briefly, shift control device 46 includes a selector head 48 secured to shift rail 44 for movement therewith. Head 48 supports a depending finger 50. First and second shift fork members 52 and 54 are engaged by the synchronizers with the output gears on output shaft 16. A shift lever member 56 is pivotable about a fulcrum 58 and is engaged with reverse idler gear 40. The orientation is such that upon rotation of shift rail 44 and head 48, finger 50 is rotated into alignment with any one of the members for crossover selection. Upon longitudinal sliding movement of shift rail 44 and head 48, finger 50 carries the selected member longitudinally to engage the appropriate gears, thus establishing the selected gear ratio.

An interlock collar 60 is rotatable with head 48, but is restrained by housing 12 from sliding longitudinally. Upon rotational movement of head 48, collar 60 rotates into alignment with the two members not selected by finger 50, thus preventing them from moving longitudinally.

Shift control device 46 thus is rotatable to first, second and third neutral positions N1, N2 and N3 for speed ratio selection, as shown in FIGS. 2 and 3. Once this selection has been made, longitudinal movement of shift control device 46 establishes the selected speed ratio.

With finger 50 in alignment with member 54, shift control device 46 is in what may be referred to as the free neutral position N2 associated with the third and fourth forward speed ratios. From this free neutral position shift control device 46 may be rotated counter-clockwise to neutral position N1 associated with the first and second forward speed ratios, or clockwise to neutral position N3 associated with either the reverse speed ratio (FIG. 2) or the fifth forward and reverse speed ratios (FIG. 3).

Free neutral position N2 is the position which shift control device 46 assumes when no speed ratio is established and the vehicle operator removes his hand from the shift stick. The other two neutral positions N1 and N3 are those to which shift control device 46 may be rotated in one plane by the operator. As noted above, from any of the three neutral positions shift control device 46 may be moved longitudinally in another plane to engage appropriate gears and establish a selected speed ratio.

Transmission 10 is of the constant mesh variety, with all of the gears except reverse idler gear 40 and reverse output gear 42 driven by input gear 14. The synchronizers engage selected output gears with output shaft 16 to establish the various forward speed ratios. Reverse idler gear 40 slides into meshing engagement with countershaft gear 34 and reverse output gear 42 to establish the reverse speed ratio. When the engine is running, the clutch is engaged and the transmission is in free neutral, all of the gears except reverse idler gear 40 and reverse output gear 42 are rotating. Gear 40 is not engaged with gears 34 and 42.

In order to engage first or second, the clutch is disengaged and shift control device 46 is rotated to bring finger 50 into alignment with member 52. Shift control device 46 is then moved longitudinally in one direction to engage first or in the opposite direction to engage second.

To engage third or fourth, the clutch is disengaged and shift control device 46 is rotated to bring finger 50 into alignment with member 54. Shift control device 46 is then moved longitudinally in one direction or the other to engage third or fourth.

To engage reverse in a four-speed transmission, or fifth or reverse in a five-speed transmission, the clutch is disengaged and shift control device is rotated to bring finger 50 into alignment with member 56. Longitudinal movement of shift control device in one direction or the other engages the selected speed ratio.

More specifically, when shifting from neutral into reverse the operator first disengages the clutch, at which point the constantly meshed gears start spinning down. The operator moves the shift stick laterally in one plane to rotate shift rail 44 and head 48 about axis A to neutral crossover position N3 in which finger 50 is in alignment with member 56. Then the operator moves the shift stick longitudinally in another plane to slide shift rail 44 and head 48 along axis A. This pivots member 56 about fulcrum 58, causing it to slide reverse idler gear into meshing engagement with constantly meshed countershaft gear 34 and reverse output gear 42. If this meshing engagement were to be initiated before rotation of gear 34 had stopped, a clashing of gears would result.

In accordance with the present invention, a transmission brake 62 is provided to prevent clash by braking the constantly meshed gears prior to crossover selection. As shown in FIG. 4, brake 62 includes a gapped friction ring 64 having an interference fit on one of the constantly meshed gears, for example an element of gear 20. Friction ring 64 is formed with a tab 66 extending radially outwardly at one end thereof adjacent the gap.

Brake 62 also includes an arm 68 having a portion 70 thereof pivotable into and out of the rotational path of tab 66. The orientation is such that when arm portion 70 is out of the rotational path of tab 66 (phantom line position) friction ring 64 is free to rotate with gear 20, and brake 62 is disengaged. When arm portion 70 is in the rotational path of tab 66 (solid line position) it blocks rotation of friction ring 64 with gear 20. This develops a frictional braking force tending to retard rotation of all the constantly meshed gears, and brake 62 is engaged.

It is preferable to arrange friction ring 62 on gear 20 such that the frictional braking force tends to loosen rather than tighten its grip. (Assume counterclockwise rotation of gear in FIG. 4.) This eliminates drastic changes in the transmitted torque which is an exponential function of the coefficient of friction in a ring-tightening condition, but for all practical purposes is independent of the coefficient of friction in a ring-loosening condition. As a result, it is unnecessary to consider oil viscosity, temperature, surface friction of the slipping machine elements, etc. when designing the brake into a transmission.

As shown in FIGS. 4 and 5, arm 68 defines a ball 72 slidably received in a socket 74 defined by housing 12. The ball and socket joint 72,74 renders arm 68 universally pivotable about its center point B. Arm 68 also defines a guide element 76 slidably received in a guide slot 78 defined by housing 12. This restricts pivotal movement of arm 68 to only one plane, the plane of the paper in FIG. 4. Resilient means, which may be a spring 80 secured to housing 12 by a bolt 82, acts upon wing portions 84 of arm 68 to bias it clockwise about point B into a blocking position, that is, a position in which arm portion 70 is in the rotational path of tab 66. Thus brake 62 is biased toward engagement.

Brake 62 also includes a release or disengaging mechanism, which may be in the form of cam means 86. As shown in FIGS. 4 and 7, cam means 86 includes a first cam device 88 which incorporates cam lobes 90 and 92 defined by arm 68. Cam lobes 90 and 92 are in sliding contact respectively with cam surfaces 94 and 96 defined by collar 60. The orientation is such that when shift control device 46 is in free neutral position N2, spring 80 biases arm 68 clockwise about point B, pivoting arm portion 70 into the rotational path of tab 66. Thus brake 62 is engaged when shift control device 46 is in the free neutral position.

As noted above, for crossover selection shift control device 46 is rotated from free neutral position N2 to either of the other neutral positions N1 or N3. Rotation of shift control device 46 in either direction causes one of cam surfaces 94 or 96 to move its associated cam lobe 90 or 92, thereby pivoting arm 68 counterclockwise about point B. Arm portion 70 is pivoted out of the rotational path of tab 66. Thus brake 62 is disengaged as shift control device 46 rotates from free neutral position N2. This is illustrated diagramatically in FIGS. 2 and 3 as horizontal movement from free neutral position N2.

As shown in FIGS. 4 and 8, cam means 86 also includes a second cam device 98. Cam device 98 includes a cam notch 100 defined by head 48. A cam pin 102 is slidably received in a bore 104 defined by collar 60. Pin 102 is in sliding contact with one side 106 of arm 68. The orientation is such that when shift control device 46 is in free neutral position N2, pin 102 extends into notch 100. Spring 80 biases arm 68 clockwise about point B, pivoting arm portion 70 into the rotational path of tab 66. Thus brake 62 is engaged when shift control device 46 is in the free neutral position.

As noted above, in order to establish the third or fourth forward speed ratio, shift control device 46 is moved longitudinally from free neutral position N2 along axis A in one direction or the other. This longitudinal movement causes head 48 to cam pin 102 out of notch 100, thereby pivoting arm 68 counterclockwise about point B. Arm portion 70 is pivoted out of the rotational path of tab 66. Thus brake 62 is disengaged as shift control device 46 moves longitudinally from free neutral position N2. This is illustrated diagramatically in FIGS. 2 and 3 as vertical movement from free neutral position N2.

From the foregoing it is apparent that brake 62 is engaged when shift control device 46 is in free neutral position N2. When shift control device 46 is rotated away from position N2, brake 62 is disengaged. Brake 62 also is disengaged when shift control device 46 is moved longitudinally away from position N2.

This braking arrangement represents a substantial advantage over prior arrangements, as the constantly meshed gears are braked when the shift control device is in free neutral, that is, prior to crossover selection. The brake is released when the shift control device is moved from free neutral. Establishment of the forward speed ratios is not inhibited, while the reverse speed ratio may be established without the clashing of gears.

There is an added advantage of this arrangement. Because the brake is engaged when the shift control device is in free neutral, the friction thus developed provides an anti-rattle function when the transmission is in neutral, the clutch is engaged, and the engine is idling.

It should be understood that while a preferred embodiment of the invention has been shown and described, this is to be considered as illustrative and may be modified by those skilled in the art. It is intended that the claims herein cover all such modifications as may fall within the spirit and scope of the invention.

What is claimed is:

1. In a multiple speed ratio transmission having a plurality of constantly meshed gears defining a plurality of speed ratios, another gear movable into meshing relationship with said constantly meshed gears for defining another speed ratio, said gears being selectively engageable for establishing speed ratios providing torque delivery paths between an input and an output, and control means movable to a free neutral position and to at least one other neutral position for selecting at least one of said speed ratios, said control means being movable from at least one of said neutral positions for establishing a selected speed ratio; the improvement comprising an anti-clash and anti-rattle brake effective to brake said constantly meshed gears, said brake including means for engaging said brake upon movement of said control means to said free neutral position, and means for disengaging said brake in response to movement of said control means from said free neutral position.

2. In the transmission of claim 1 wherein said control means includes a shift rail rotatable about its axis to said neutral positions for said speed ratio selection; said engaging means including resilient means biasing said brake for engagement upon rotation of said shift rail to said free neutral position, and said disengaging means including cam means disengaging said brake in response to rotation of said shift rail from said free neutral position.

3. In the transmission of claim 1 wherein said control means includes a shift rail slidable along its axis from said neutral positions for said speed ratio establishment; said engaging means including resilient means biasing said brake for engagement upon sliding of said shift rail to said free neutral position, and said disengaging means including cam means disengaging said brake in response to sliding of said shift rail from said free neutral position.

4. In the transmission of claim 2 wherein said shift rail is slidable along its axis from said neutral positions for said speed ratio establishment; said resilient means also biasing said brake for engagement upon sliding of said shift rail to said free neutral position, and said cam means also disengaging said brake in response to sliding of said shift rail from said free neutral position.

5. In the transmission of claim 4; said cam means including a first cam device disengaging said brake in response to rotation of said shift rail from said free neutral position, and a second cam device disengaging said brake in response to sliding of said shift rail from said free neutral position.

6. In the transmission of claim 4; said brake including a friction ring having an interference fit on one of said constantly meshed gears for rotation therewith, and an arm movable by said biasing means into the rotational path of said friction ring upon rotational or sliding movement of said shift rail to said free neutral position such that rotation of said friction ring is blocked and a frictional braking force is applied to said one constantly meshed gear, said arm being movable by said cam means out of the rotational path of said friction ring in response to rotational or sliding movement of said shift rail from said free neutral position such that rotation of said friction ring is unblocked and no frictional braking force is applied to said one constantly meshed gear.

7. In the transmission of claim 6; said cam means including a first cam device moving said arm out of the rotational path of said friction ring in response to rotation of said shift rail from said free neutral position, and a second cam device moving said arm out of the rotational path of said friction ring in response to sliding of said shift rail from said free neutral position.

8. In the transmission of claim 6; said friction ring having a gap, and said brake being constructed and arranged such that said frictional braking force tends to loosen the fit of said friction ring on said one constantly meshed gear.

9. In the transmission of claim 6; said arm being pivotable into and out of the rotational path of said friction ring.

10. In the transmission of claim 9; said cam means including a first cam device pivoting said arm out of the rotational path of said friction ring in response to rotation of said shift rail from said free neutral position, and a second cam device pivoting said arm out of the rotational path of said friction ring in response to sliding of said shift rail from said free neutral position.

11. In the transmission of claim 9; said friction ring having a gap, and said brake being constructed and arranged such that said frictional braking force tends to loosen the fit of said friction ring on said one constantly meshed gear.

12. In the transmission of claim 9; a housing defining a socket and a guide slot, said arm defining a ball and a guide element, said ball being received in said socket to define therewith a ball and socket joint, and said element being slidably received in said slot, said element and slot being oriented such that said arm is pivotable in a single plane about the center of said joint, said arm being pivotable by said biasing means into the rotational path of said friction ring and by said cam means out of the rotational path of said friction ring.

13. In the transmission of claim 12; said cam means including a first cam device pivoting said arm out of the rotational path of said friction ring in response to rotation of said shift rail from said free neutral position, and a second cam device pivoting said arm out of the rotational path of said friction ring in response to sliding of said shift rail from said free neutral position.

14. In the transmission of claim 13; said friction ring having a gap, and said brake being constructed and arranged such that said frictional braking force tends to loosen the fit of said friction ring on said one constantly meshed gear.

15. In the transmission of claim 10 wherein said control means includes a selector head rotatable and slidable with said shift rail, and an interlock collar rotatable but not slidable with said heat and shift rail; said first cam device including first and second cam surfaces defined by said collar, and first and second cam lobes defined by said arm, said surfaces and lobes being oriented such that said arm is in the rotational path of said friction ring when said shift rail is in said free neutral position, said first surface camming said first lobe in response to rotation of said shift rail in one direction from said free neutral position such that said arm is pivoted out of the rotational path of said friction ring, and said second surface camming said second lobe in response to rotation of said shift rail in the opposite direction from said free neutral position such that said arm is pivoted out of the rotational path of said friction ring.

16. In the transmission of claim 15; said second cam device including a notch defined by said head, and a pin slidably received by said collar, said notch and pin being oriented such that said pin extends into said notch when said shift rail is in said free neutral position, said head camming said pin against said arm in response to sliding of said shift rail in either direction from said free neutral position such that said arm is pivoted out of the rotational path of said friction ring.

17. In the transmission of claim 10 wherein said control means includes a selector head rotatable and slidable with said shift rail, and an interlock collar rotatable but not slidable with said head and shift rail; said second cam device including a notch defined by said head, and a pin slidably received by said collar, said notch and pin being oriented such that said pin extends into said notch when said shift rail is in said free neutral position, said head camming said pin against said arm in response to sliding of said shift rail in either direction from said free neutral position such that said arm is pivoted out of the rotational path of said friction ring.

18. In the transmission of claim 2; said brake including a friction ring having an interference fit on one of said constantly meshed gears for rotation therewith, and an arm movable by said biasing means into the rotational path of said friction ring upon rotational movement of said shift rail to said free neutral position such that rotation of said friction ring is blocked and a frictional braking force is applied to said one constantly meshed gear, said arm being movable by said cam means out of the rotational path of said friction ring in response to rotational movement of said shift rail from said free neutral position such that rotation of said friction ring is unblocked and no frictional braking force is applied to said one constantly meshed gear.

19. In the transmission of claim 18; said friction ring having a gap, and said brake being constructed and arranged such that said frictional braking force tends to loosen the fit of said friction ring on said one constantly meshed gear.

20. In the transmission of claim 18; a housing defining a socket and a guide slot, said arm defining a ball and a guide element, said ball being received in said socket to define therewith a ball and socket joint, and said element being slidably received in said slot, said element and slot being oriented such that said arm is pivotable in a single plane about the center of said joint, said arm being pivotable by said biasing means into the rotational path of said friction ring and by said cam means out of the rotational path of said friction ring.

21. In the transmission of claim 18 wherein said control means includes a selector head rotatable and slidable with said shift rail, and an interlock collar rotatable but not slidable with said head and shift rail; said cam means including first and second cam surfaces defined by said collar, and first and second cam lobes defined by said arm, said surfaces and lobes being oriented such that said arm is in the rotational path of said friction ring when said shift rail is in said free neutral position, said first surface camming said first lobe in response to rotation of said shift rail in one direction from said free neutral position such that said arm is pivoted out of the rotational path of said friction ring, and said second surface camming said second lobe in response to rotation of said shift rail in the opposite direction from said free neutral position such that said arm is pivoted out of the rotational path of said friction ring.

22. In the transmission of claim 3; said brake including a friction ring having an interference fit on one one of said constantly meshed gears for rotation therewith, and an arm movable by said biasing means into the rotational path of said friction ring upon sliding movement of said shift rail to said free neutral position such that rotation of said friction ring is blocked and a frictional braking force is applied to said one constantly meshed gear, said arm being movable by said cam means out of the rotational path of said friction ring in response to sliding movement of said shift rail from said free neutral position such that rotation of said friction ring is unblocked and no frictional braking force is applied to said one constantly meshed gear.

23. In the transmission of claim 22; said friction ring having a gap, and said brake being constructed and arranged such that said frictional braking force tends to loosen the fit of said friction ring on said one constantly meshed gear.

24. In the transmission of claim 22; a housing defining a socket and a guide slot, said arm defining a ball and a guide element, said ball being received in said socket to define therewith a ball and socket joint, and said element being slidably received in said slot, said element and slot being oriented such that said arm is pivotable in a single plane about the center of said joint, said arm being pivotable by said biasing means into the rotational path of said friction ring and by said cam means out of the rotational path of said friction ring.

25. In the transmission of claim 22 wherein said control means includes a selector head rotatable and slidable with said shift rail, and an interlock collar rotatable but not slidable with said head and shift rail; said cam means including a notch defined by said head, and a pin slidably received by said collar, said notch and pin being oriented such that said pin extends into said notch when said shift rail is in said free neutral position, said head camming said pin against said arm in response to sliding of said shift rail in either direction from said free neutral position such that said arm is pivoted out of the rotational path of said friction ring.

* * * * *